Patented Mar. 30, 1937

2,075,542

UNITED STATES PATENT OFFICE 2,075,542

FILTRATION OF SEWAGE AND THE LIKE

Francis L. Pruyn, Sea Girt, N. J., assignor to Underpinning and Foundation Company, Inc., New York, N. Y., a corporation of New York No Drawing. Application October 11, 1933, Serial No. 693,156

4 Claims. (Cl. 210—203)

This invention relates to the filtration of sewage and the like and more particularly to the control of such filtration so as to obtain increased capacity without decrease in quality or effectiveness.

It has been proposed heretofore to effect filtration by adding to a sewage stream flowing to a filter a charge of suitable material, preferably paper pulp, in sufficient quantity to assure an effective filtering mat or cake and to remove the cake from the filter, repulp it and restore it to the sewage a plurality of times until the material is exhausted, that is has taken up such a quantity of sewage solids as to render clogging of the filter probable. When this stage is reached, the exhausted pulp is withdrawn and fresh pulp added. This kind of filtration has proved to be very effective in producing a filtrate having desired qualities as to clarity and purity. Frequently, however, it is found that it is difficult or impossible to obtain the desired volume or capacity of filtration. One of the principal objects of the present invention is to obviate this condition.

Other important features of the invention relate to means and methods for attaining filtration effectively and economically. According to a preferred manner of carrying out the invention, use is made of paper pulp, as hereinbefore described, in connection with granular material such as sawdust to open up the cake, or render it more porous, whereby the capacity for filtration will be very much increased without detracting from the quality of the filtration. The relative proportions of the paper pulp and sawdust may be varied to suit various conditions arising for example from variation in the sewage to be treated. In some cases it has been found desirable to use about equal quantities by weight of paper pulp and sawdust, the sawdust being preferably of the medium size, that is about one-sixteenth of an inch from side to side.

Preferably the sawdust is mixed with the paper pulp and this mixture is added to the sewage stream. It should be understood, however, that the paper pulp and sawdust may be added separately. For example, the paper pulp may be added to the sewage stream and the sawdust may be added at any later time or times.

In carrying out the method in a preferred manner, a suitable amount of paper may be shredded in any suitable manner and then mixed with make-up water in a tank to bring the pulp to the requisite consistency. Preferably the sawdust or the like is added in this tank, the amount of make-up water being varied accordingly. The pulpy mixture thus formed is then transferred as by pumping to one or more tanks or repulping troughs where the pulp is mixed with sewage of a sewage stream and then is passed from each repulping trough into the tank of a corresponding rotary vacuum filter. As soon as the proper amount of the pulp mixture has been passed to the repulping trough or troughs, the connection from the make-up trough is closed and filtration is begun.

Each of the vacuum filters may include a rotary drum on which is formed a cake of paper pulp, sawdust, and sewage solids as the filtrate is drawn through and out of the drum. After the cake has been withdrawn from the liquid in the filter tank, it is stripped from the drum and returned to the repulping trough for repulping and later return to the filter tank. Preferably the vacuum is kept low to leave the cake soft and thereby facilitate repulping. The cycle just described is repeated until the accumulation of sewage solids is substantially sufficient to clog the cake. The cake is then removed from the filter drum without passing it to the repulping trough. In this operation the sawdust is used primarily to render the cake porous so as to obtain the requisite capacity of filtration. Obviously the quantity of sawdust may be varied as required. Although in the specific operation just described the sawdust was added in the mixing or make-up tank, it may be added at other parts of the apparatus, for example in each repulping trough.

It has been found that by the use of sawdust and the like the capacity of apparatus for carrying out this method may be increased and controlled. The mixture of paper pulp and sawdust may be handled in the same manner as paper pulp had been handled heretofore.

It should be understood that various changes may be made in the carrying out of the invention and that certain features may be used without others without departing from the true spirit and scope of the invention.

Having thus described my invention, I claim:

1. The method of filtering sewage which includes the addition to a sewage stream flowing to a filter of paper pulp and medium sawdust in substantially equal amounts by weight, the paper pulp serving to assure the formation of a suitable cake and the sawdust serving to control the density of the cake and thereby control the rate of filtration, the passing of the mixture thus formed to the filter, the repulping of the cake, and the return of the repulped cake to the sewage stream before it reaches the filter.

2. The method of filtering sewage which includes the mixing of paper pulp and sawdust in the proportion by weight of from forty-five to fifty-five percent of paper pulp and from fifty-five to forty-five percent of sawdust, the addition of such mixture to a sewage stream flowing to a filter, the passage to the filter of the mixture containing the sewage, the removal of the cake from the filter, the repulping of the cake, and the return of the repulped cake to the sewage stream flowing to the filter.

3. The method of separating solids from a solid-bearing liquid which comprises forming paper pulp, adding the pulp to the solid-bearing liquid to provide fibres which will mat together in filtering to produce a filter cake capable of separating from the liquid solids incapable of matting together, adding to the mixture of the paper pulp and the solid-bearing liquid granular material to effect rapid passage of the liquid through the filter cake while preventing the passage of the non-matting solids.

4. The method of filtering sewage which includes mixing with a sewage stream, flowing to a filter, cellulose pulp in the requisite amount to assure an effective filter cake, and adding to such mixture loose granular material of the requisite size of grains and in the requisite amount to impart to the cake the requisite porosity and resultant filter rate.

FRANCIS L. PRUYN.